UNITED STATES PATENT OFFICE.

RICHARD GAGGIN, OF ERIE, PENNSYLVANIA.

IMPROVEMENT IN PROCESSES FOR DEODORIZING HYDROCARBON OILS.

Specification forming part of Letters Patent No. 118,359, dated August 22, 1871.

*To all whom it may concern:*

Be it known that I, RICHARD GAGGIN, of the city and county of Erie and State of Pennsylvania, have invented certain new and useful Improvements in the Method of Deodorizing Paraffine, Kerosene, &c.; and I do hereby declare that the following is a full, clear, and exact description of the same.

The object of my invention is to furnish a cheap and effective means whereby the offensive odor of paraffine, kerosene, and other like oils is readily removed, and which is accomplished without in any manner injuriously affecting the illuminating properties of the oil treated. I am well aware that many experiments have been essayed to accomplish the result attained by my invention, but only with partial success. My invention consists in subjecting the paraffine, kerosene, and other like oils to the direct action of dry chlorine gas, and this alone, in contradistinction to the process in which steam is passed through chloride of lime, which does not produce pure chlorine gas such as I use, but only impregnates the steam with a small portion of the gas or fume which is liberated from the lime, and which, when introduced into the oil, is injurious, as the steam, of course, soon condenses and becomes water. My invention is also distinguishable from the process in which the chemical ingredients used are themselves introduced into the oil, as the object in said process is to produce chromic acid as a bleacher, which is very expensive, and which is so caustic as to render its use impracticable.

As there is nothing new in the apparatus used, I have illustrated or shown none by drawing.

In any suitable vessel I generate the chlorine gas, which may be produced by any of the processes familiar to chemists, such, for instance, as pouring muriatic acid on chloride of lime, or sulphuric acid on black oxide manganese, chloride sodium, (or common salt,) as well as by the union of other well-known chemical agents.

The gas thus generated in a perfectly dry state, either with or without the addition of atmospheric air, I convey through a suitable pipe to the tank containing the oil, and which, by its direct action on the oil, deodorizes it.

I am aware that O. Lugo obtained Letters Patent of the United States, January 1, 1867, No. 60,757, for deodorizing petroleum. His process, as described in the specification that accompanies his patent, is as follows: "I take two pounds of nitrate of potassa, one-fourth of an ounce of chloride of sodium, and half a dram bichromate of potash; mix them well and add one pound sulphuric acid; mix again, and as white fumes appear I turn in two gallons of oil to be deodorized. I mix and blow it through the mixture and let it deposit, after subjecting the oil to the chemical action of the ingredients named." He says: "Finally, I treat it with hypochlorite of soda and let it settle or filter."

Thus, it will be seen, Lugo has two distinct processes, each of which is essential to effect the object aimed to be attained; I only one. And thus, again, the advantage of saving one step or stage in the process of deodorizing the oil. And again, Lugo brings his strong acids in direct contact with the oil, which necessarily impairs its illuminating properties; I use no strong acids, and the acids which even I do use are not brought in contact with the oil, but only the dry chlorine gas, which they aid in producing.

Therefore, in view of Lugo, I claim for my process these advantages: Cheapness as to the ingredients used, the saving of an important step in the process, and effecting a deodorizing of the oil without impairing its illuminating properties.

Having thus fully described my invention, what I claim therein as new, and desire to secure by Letters Patent of the United States, is—

Pure dry chlorine gas, either with or without atmospheric air, as a deodorizer of paraffine, kerosene, and other like oils.

In testimony whereof I have signed my name to this specification in the presence of two subscribing witnesses.

RICHARD GAGGIN.

Witnesses:
RICHARD F. GAGGIN,
BENJ. HERSHEY.